March 14, 1939.   H. CAMINEZ   2,150,876
SCREW FASTENING FOR HIGH STRENGTH CONNECTIONS
Filed Feb. 12, 1938   4 Sheets-Sheet 1

INVENTOR.
Harold Caminez
BY Williams, Rich & Morse
ATTORNEYS

March 14, 1939.   H. CAMINEZ   2,150,876
SCREW FASTENING FOR HIGH STRENGTH CONNECTIONS
Filed Feb. 12, 1938   4 Sheets-Sheet 3

INVENTOR.
Harold Caminez
BY Williams, Rich & Morse
ATTORNEYS

March 14, 1939.   H. CAMINEZ   2,150,876

SCREW FASTENING FOR HIGH STRENGTH CONNECTIONS

Filed Feb. 12, 1938   4 Sheets-Sheet 4

INVENTOR.
Harold Caminez
BY Williams, Rich & Morse
ATTORNEYS

Patented Mar. 14, 1939

2,150,876

UNITED STATES PATENT OFFICE 2,150,876

SCREW FASTENING FOR HIGH STRENGTH CONNECTIONS

Harold Caminez, New York, N. Y., assignor to Aircraft Screw Products Co., Inc., Brooklyn, N. Y., a corporation of New York Application February 12, 1938, Serial No. 190,168

10 Claims. (Cl. 85—46)

With the increased use of high strength steel for screws and studs, there is an increased demand for a stronger and more reliable form of screw thread fastening or connection for these screws and studs, especially when they are used in castings and forgings of aluminum and magnesium alloys that are employed in the automotive and aircraft industries. An object of my present invention is to provide a new type of thread connection which utilizes a thread groove in the screw or stud member of such form and proportions that the strength of this member under impact and fatigue loads is appreciably greater than when the present standard types of screw threads are used. Another object of my invention is to provide a thread form in the female threaded member which will have high strength and adequate resistance to shearing off or stripping of the threads. A further object of my invention is to provide a smooth, polished thread surface in contact with the female threaded member thereby protecting it from being damaged, worn or abraded by any roughness of the male screw member when the parts are assembled. Another object of my invention is to provide a material of good anti-friction qualities between the male and female threaded members so that these parts can be firmly tightened up under load without seizing or binding, and which will also prevent them from freezing or welding together so that they may later be readily unscrewed. Another object of the invention is to provide a thread connection which will protect the thread in the female threaded member and will accommodate itself to the different changes in length that occur under varying temperature conditions when the coefficient of expansion of the male screw or stud material is different from that of the female threaded material. A further object of my invention is to provide an efficient and positive thread-lock for a screw stud fastening.

My invention may be more specifically stated as a means for providing a connection of high strength and light weight that is particularly suitable for a screw or stud member of high strength steel that fastens into a light metal alloy or similar material whose hardness and strength are appreciably less than that of the screw material. The new screw connection constructed in accordance with my invention will also provide for the differences in expansion so that temperature changes will not cause excessive stresses to be created when a steel screw is used in a light alloy member.

Among the advantages of a thread connection embodying my invention resides in the fact that it provides a smooth surfaced material of good anti-friction qualities between the screw and its mating threaded member. My screw connection also results in a screw member of high strength both in tension and in torsion. Because of the good antifrictional qualities of my thread combined with the high torsional strength of my screw, I have found that my screw fastening is superior wherever a tight fitting threaded connection is desired which will have the maximum resistance to loosening up under high loads or vibrations.

To these and other ends my invention consists in certain further improvements all as will be further described in the following specification, the novel features thereof being particularly pointed out in the appended claims.

In the drawings.

Similar reference numerals in the several figures indicate similar parts.

Figure 1:
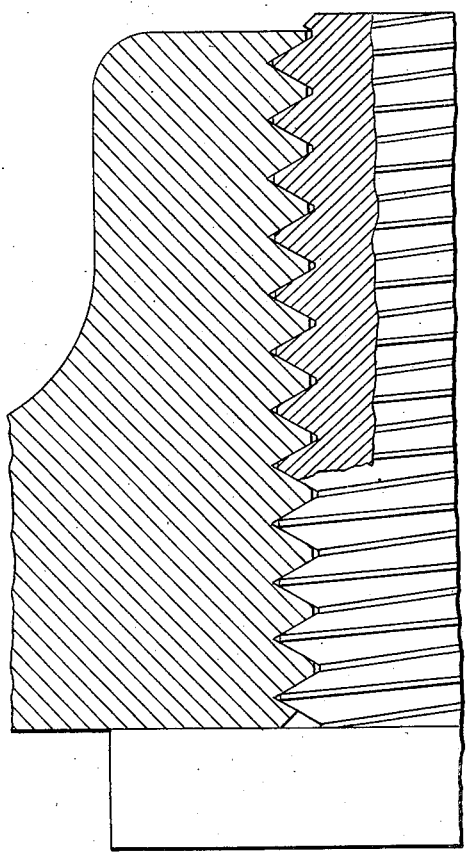
Figs. 1 and 2 are cross-sectional views of a standard threaded-socket in light metal alloys, the first showing a screw and boss assembly at normal temperature and the second the condition of over-stressing the threads when higher temperatures are applied to the parts.

The conventional type of screw threads when employed for the purpose of connecting a steel screw or stud in a female threaded member of softer and weaker material are subject to several weaknesses. As shown in Fig. 1, the V groove on the conventionally threaded male member cooperates with the corresponding V groove in the female threaded member. While the V groove in the female threaded member produces a thread form in the part that has high resistance to shearing or stripping of the threads, the same V thread form in the high strength steel male screw member creates a sharp notch effect in this part which greatly reduces its resistance to impact and fatigue loads so that in service these screws have a tendency to break off sharply across the root of the threads. Another difficulty with the conventional screw threads is that when a tight fitting steel screw or stud is assembled into a female threaded member of a softer material, such as aluminum or magnesium alloys, any roughness or imperfections on the threads of the steel screw cut or abrade the thread in the female threaded member so that these threads become worn and oversized when the parts are assembled and disassembled.

A further weakness in the conventional screw thread when used to unite a steel screw to an aluminum or magnesium alloy female threaded member is the inability of this thread to accommodate itself to the differences in expansion of the mating threaded parts due to temperature changes. Fig. 1 shows the parts as assembled at normal temperature with the correct thread fit. It is seen that the pitch of the thread on the screw coincides with that of the female threaded member so that the contact pressure on each thread is uniform and the load on the screw is evenly divided among all the threads. However, the coefficient of expansion of aluminum is about two times and that of magnesium is about two and a half times that of steel with the result that when the assembly is heated up in service, the female threaded member expands two to two and a half times as much as the male screw member and the condition illustrated in Fig. 2 results. The temperature rise causes an increase both in the diameters of the parts and in the length of the thread pitch. The diametral movement between the mating threads causes the hard steel screw to wear and abraid the softer light alloy threads, particularly if the screw is carrying a heavy load. The change in pitch causes the end threads of the light alloy threaded member to be pressed heavily against the comparatively rigid thread of the steel screw. It is seen that it is necessary to move or deflect these threads in order to compensate for this relative change in pitch. The comparatively rigid thread of the steel screw prevents any bending in the thread of the female threaded member, with the result that this deflection can only be accomplished by shear strains at the base of the light alloy threads. These shear strains are accompanied by high stress concentrations which cause the threads to progressively weaken and fail, thereby limiting both the load and the useful life of these screw thread connections when light alloy parts are subjected to varying temperatures in service operation.

Figure 3:
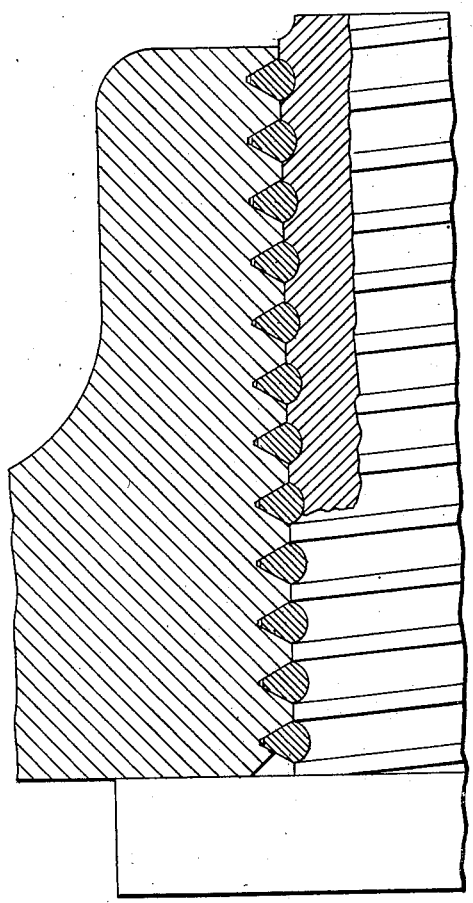
Figs. 3 and 4 are similar views respectively of a stud and boss connected with a thread embodying my present invention, the latter figure showing the manner in which the stresses are compensated by the tilting action of the different convolutions of the connection element.

To overcome all of the above mentioned limitations of the conventional screw, in my invention the screw thread connection is made as shown in Fig. 3. Instead of the thread of the steel screw or stud member engaging directly with the boss or female threaded light alloy member, I employ a specially formed wire spring thread element between the two mating threaded members. The thread element which I use is one having thermal expansion properties approximating that of the light metal alloy of which the boss is formed. In practice I have found that a wire made of hard drawn bronze is admirably adapted for the purpose, as it possesses the additional requirement that it presents a hard surface of good bearing qualities against the grooves in the steel stud. Such a wire I coil into a spiral, the diameter of the main body of the coil being sufficiently greater than the diameter of the threaded cut in the light alloy material so that it is held firmly therein by a definite spring tension. In cross-section, the wire has two flat sides arranged at an angle of 60 degrees which meet with a rounded side at their diverging ends, and are connected by a short flat side at their converging ends, with the result that the section of the wire consists of a truncated equilateral triangle formed on the segment of a circle. The dimensions of this section are proportioned with reference to the screw pitch as will be more particularly pointed out in connection with the illustrations shown in Fig. 9, in which the dimensions of the wire section with reference to the thread pitch are those selected for any given purpose.

In carrying out my invention, I cut in the boss a 60° V-shaped groove, the adjacent convolutions of which are spaced to give the desired thread pitch P. The pitch diameter of this groove I make equal to the basic screw diameter plus 0.4 times the thread pitch. The depth of the groove is 0.59 times the thread pitch. I find that these dimensions produce a bearing area for the wire which is adequate to support without crushing all the load that the thread can withstand without shearing off at the base. The bottom of this 60° thread is flat as shown at $a$, and the corresponding angular edge of the wire is likewise flattened as indicated at $b$, its total depth being such that the wire is not seated against the bottom of the groove, thus providing a small space of approximately 0.04 times the pitch for compensation purposes, and to insure the wire seating itself equally against both sides of the V groove.

I have discovered that this V thread groove completely meets the requirements for the female threaded member, especially when this member consists of a material such as aluminum or magnesium alloy which is relatively soft compared with the high strength steel screw with which it is mated. The strength of the screw connection in the female threaded member is determined by the shear area available at the base of its threads, and I have found that the V-shaped thread produces a thread form of maximum shear strength. The depth of this V thread should be proportioned to provide sufficient bearing area to resist crushing of the thread surface and this depth should also be considered in conjunction with the angle of the V so that the thread groove can be produced accurately and economically in the female threaded member by the usual manufacturing methods. I find that the 60 degree V thread groove proportioned as I have shown in Fig. 9, produces a thread form in the female threaded member that meets the requirements of maximum shear strength, adequate bearing area, and satisfactory manufacturing requirements.

Figure 6:
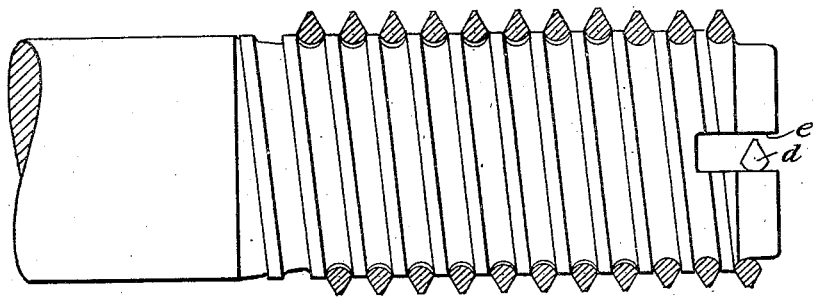
Fig. 6 is a side elevation of a stud showing the mating groove and the wire coil assembled thereon.
Figure 9:
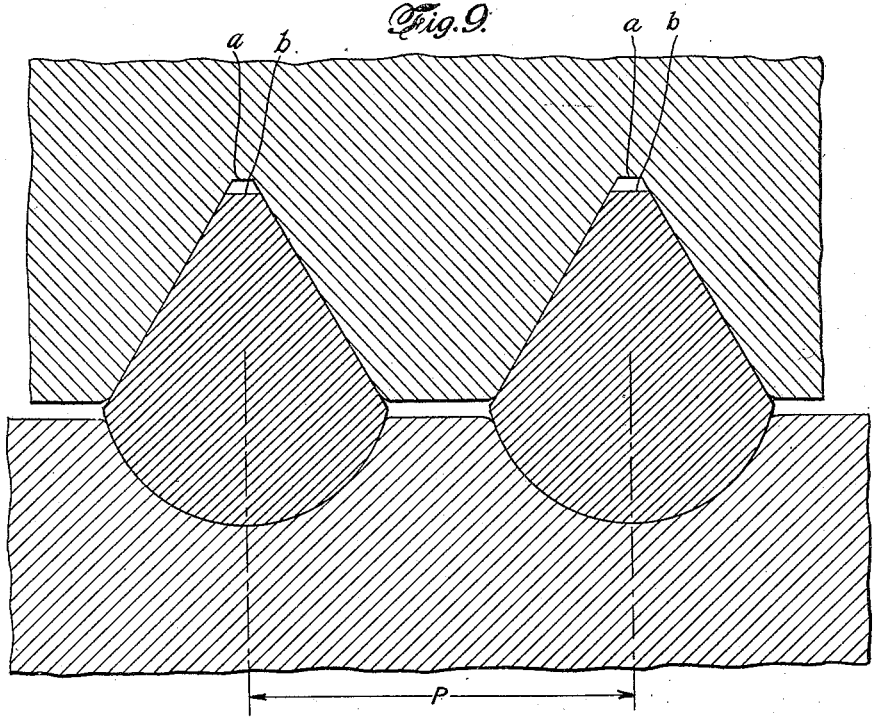
Fig. 9 is an enlarged cross-sectional view showing the two adjacent convolutions of the thread to facilitate a description of the proportions of the parts.

The requirements of the thread groove in the male threaded member are quite different, particularly when the screw or stud is made of a high strength material such as hardened steel. Referring to Figs. 6 and 9, it will be seen that in this member I employ a thread groove whose cross-section is the segment of a circle, the diameter of which is 0.75 times the thread pitch. The height of this segment or the depth of the thread groove is equal to 0.3 times the thread pitch or 0.4 times the circle diameter. It will be noticed that this height, which is equal to the portion of the wire projecting beyond the inner face of the boss, is approximately only one-half the full depth of the V groove, thereby giving a comparative shallowness to the circular thread form and a small bearing area against the hard steel male screw member in comparison to the deeper and greater bearing area which the wire has in the softer boss material.

The shallow circular form thread groove in the male screw member insures greater strength and reliability in this part. Failures of screws and studs made of high strength steel that occur in service are generally caused by impact and fatigue loads and result in the screw member breaking off at the root of the thread. I find that the circular thread groove is particularly advantageous in preventing such failure. In tests which I have conducted on ⅜ inch diameter screws made from high strength alloy steel, I have discovered that by the use of this circular form thread I have increased the impact strength approximately 100% over that obtained with the standard American National V form thread of equal diameter and pitch. The circular form thread also eliminates the sharp corners which occur with the V form threads. These sharp corners are particularly undesirable in the materials employed for high strength screws as they provide focal points from which cracks through the material can originate.

While the shallow circular thread groove increases the strength of the screw member, its use also reduces or limits the available bearing area at the screw connection. I have found that to prevent crushing or bruising of the thread surface, and to allow the screw connection to stand up satisfactorily under high load, it is necessary with this thread form for the male screw member to contact a thread that has a hard smooth surface of good bearing qualities. I provide such a suitable thread surface by making the wire spring thread element of my screw connection out of hard drawn bronze wire which has a smooth, hard, dense surface of good antifriction qualities.

Thread fittings made in accordance with my invention have particular advantages for connecting high strength steel screws and studs to parts made of aluminum or magnesium alloys. It will be noted that the thread groove I employ in the female threaded member, as shown in Fig. 3, is similar in form to that used with the standard American National screw connection shown in Fig. 1. However, because of the introduction of the spring thread element, the outer diameter of the thread groove in my screw connection is correspondingly greater than that obtained with a standard screw of the same basic screw size. It is because of this that my thread connections provide greater strength and resistance to shear in the aluminum or magnesium alloy member under all conditions of operation.

Under the conditions of varying temperature operation, the advantages of my invention are even more pronounced because my thread fittings can accommodate themselves to the physical changes that occur with unequal thermal expansions without causing wear and high stress concentrations in the threads of the light alloy parts. In the consideration of the standard thread of Figs. 1 and 2, I have shown how the unequal expansion between the light alloy boss and the steel screw member produces wear in the light alloy threads due to the unequal diametral changes while the unequal pitch changes cause shear strains which produce high stress concentrations in the end threads of the light alloy member. Both these actions result in the progressive breaking down of such threads and produce a severe limitation upon their life and load-carrying ability.

Figure 2:
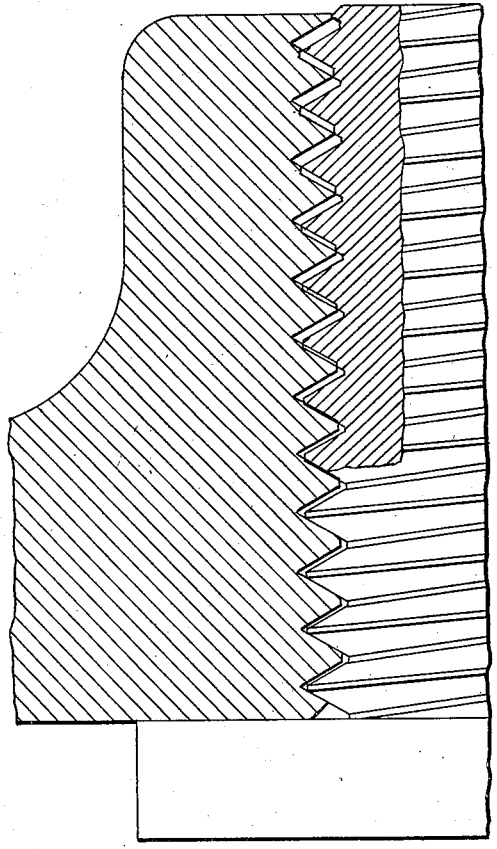
Figure 4:
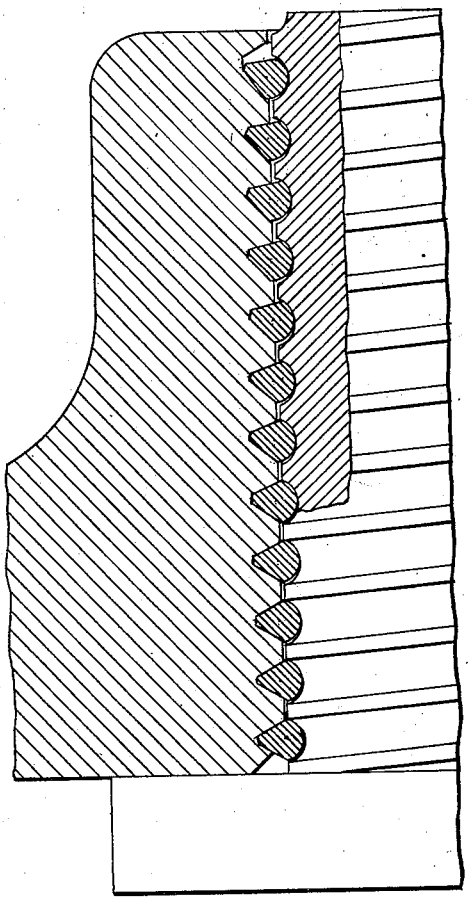
Figure 5:
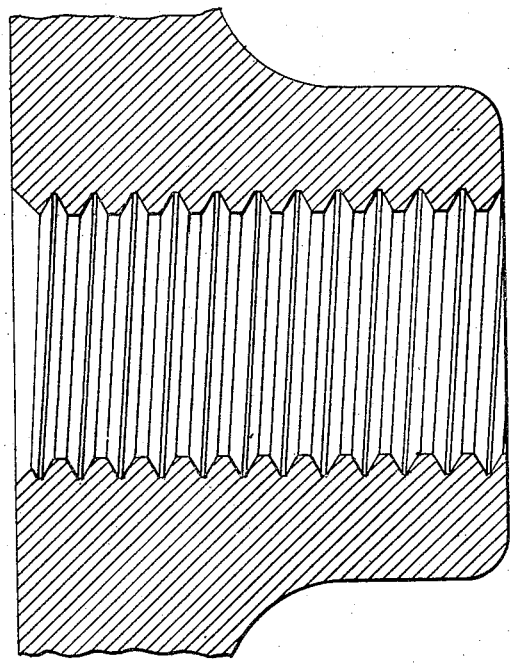
Fig. 5 is a detailed cross-sectional view showing the interior groove provided in a boss receiving the thread member proper.

A comparison of Fig. 4 with Fig. 2 shows the manner in which my improved thread element follows the light alloy in its expansion movement due to the temperature changes. The relative diametral movement with my thread fitting occurs only between the steel screw member and the wire thread element, and because of the hardness and good bearing qualities of these two materials this relative movement can be withstood without producing any wear or abrasion of the thread contact surfaces. It will be noticed that to accommodate itself to the unequal pitch changes, the part embedded in the grooves of the light alloy member has a rotary movement turning in the bearing socket formed between its circular edge and the corresponding groove in the male thread member. This slight rotary movement provides a flexibility which serves to compensate for any thread pitch inequalities occurring either in their formation originally or their aspect assumed due to the unequal expansion of the two mating threaded parts. This flexing of the thread element with relation to the steel screw, which allows the threads in the boss to deflect in bending, reduces the high stress concentration at the base of the thread in the light alloy part which would otherwise occur from the pitch inequalities caused by temperature changes.

Figure 7:
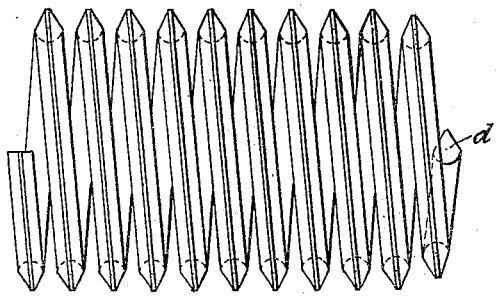
Figs. 7 and 8 are side and end views respectively of the wire coil.
Figure 8:
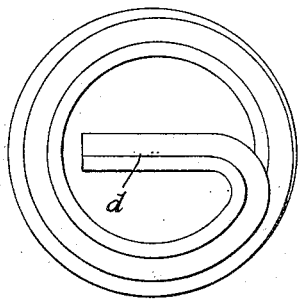

When using my screw invention with screw studs which are intended to be fitted tightly into female threaded parts, I find it sometimes convenient to first assemble the wire spring thread element on the stud and then to screw the assembly into place. To facilitate this I form the coil as shown in Fig. 7, making the main body of the spring larger in diameter than the thread surface with which it contacts, but making the first or entering convolution of a diameter to snugly fit the stud thread. I also provide the inner end of the coil with an inwardly bent tang $d$ which will enter a slot $e$ in the side or end of the stud. This smaller diameter of the coil causes it to cling to the stud and facilitates the entering of the assembly in the boss. A detail of construction which permits assembly of the coil on the stud without permanent distortion of the first coil and which allows the stud and spring assembly to be easily entered into a tight fitting threaded boss, is the short pilot diameter which I provide at the end of the stud. This pilot diameter is slightly less than the root diameter of the thread and its length is made approximately one and a half times the thread pitch.

When the stud is screwed into the tapped hole, the turns or convolutions comprising the larger diameter of the coil are closed against the stud by the friction created so that the assembly may readily be screwed into place. The spring tension in the coil gives it a normal tendency to expand against the threads in the tapped hole. Any unscrewing action in the stud causes the coil to open up further and to bind tightly in the threads of the boss. This action serves as a thread lock which prevents the stud from accidently becoming unscrewed. However, if it is desired to subsequently remove the stud, the tang of the coil which engages the stud can be sheared off by applying sufficient torque in unscrewing the stud. After the stud is removed the thread element coil may be removed from the boss and a new stud and thread element inserted, the assembly being the same as above described.

In many cases the self-locking feature that can be had with my screw connection is not required. In this event, no slot or recess e is necessary on the stud or screw. The wire coil may be assembled into the tapped hole before the male screw member is screwed into place. The tang d on the front coil offers a hold for applying a torque to the entering end of the coil for inserting the latter into the female member. After the coil is in position its spring tension holds it firmly against the side walls of the V-thread. The spring tension and wedging action effectively prevents relative rotational and axial movement between the coil and the tapped hole when a stud of a male screw member is inserted, since the friction between the stud screw and the coil tends to unwind the coil and makes it grip more firmly in the V-thread.

I have found in practice that the construction as herein outlined permits the use of greater tolerances than heretofore in the tapped holes because the thread lock provided by my thread fitting eliminates the danger of the stud working loose in service when the tapped hole is slightly oversize. A further advantage of my thread fitting for use with studs is accomplished by reason of the fact that the thread element is first screwed onto the stud and provides a smooth polished thread surface to engage with the V thread in the boss, preventing cutting or tearing of this thread and obviating the necessity of providing the thread on the stud with a particularly smooth finish. This is a marked advantage in the manufacture of high strength steel studs in that it allows the threads to be cut on the annealed material after which the studs are heat treated to provide high strength without the necessity of again refinishing the stud threads, since the surface roughness that results from this heat treatment method is covered over by the smooth surfaced wire spring thread element. The good anti-frictional qualities of the bronze wire thread combined with the high torsional strength of my screw due to the shallowness of its thread groove, also allows studs with my thread fittings to be screwed into tightly fitting tapped holes so that they will offer maximum resistance to loosening up under the action of high side loads or vibrations. These characteristics of my screw fastening makes it an ideal fastening not only for steel screws and studs that fasten into the light alloys of aluminum and magnesium, but also for other screw and stud connections where high strength and reliability are required.

What is claimed is:

1. In a screw fastening, the combination with a male screw member and a mating threaded female screw member, the threads of the latter being V-shaped in cross section and of a depth substantially 60 per cent of the thread pitch, and those of the former being segment shaped in cross section and of a depth substantially 30 per cent of the thread pitch, the angle of the V being approximately 60 degrees and the segment being approximately 80 per cent of a semicircle, of a wire coil having outer and inner faces rounded and tapered respectively to fit the thread grooves of the male and female screw members, said outer faces of the wire forming approximately a truncated equilateral triangle the crest of which does not reach the bottom of the thread groove of said female member, and said coil being initially wound with an external diameter greater than the corresponding thread diameter of said female member so as to spring in the groove of the latter when inserted.

2. A screw fastening for a boss made of a light weight metal alloy and heat treated steel male screw member comprising V-shaped and segment shaped threads cut in the boss and screw respectively, a wire having inner and outer faces shaped to fit the external and internal threads of the respective parts, said outer faces of the wire forming a truncated V the crest of which does not reach the bottom of the thread groove of said boss to insure the wire seating firmly against both side walls of said thread groove, said wire being made of a metal having a hardness approximating that of the male screw member and a coefficient of expansion approximating that of the boss material, and being originally wound with an external diameter greater than the corresponding thread diameter of said female member.

3. A screw fastening for a male screw member made of a hard, high strength metal and a female threaded member of a softer and weaker metal, comprising segment shaped and V-shaped threads cut in the made and female screw members respectively, a wire having inner and outer faces shaped to fit the external and internal threads of the respective parts, said outer faces of the wire forming a truncated V the crest of which does not reach the bottom of the thread groove of the female member to insure the wire seating firmly against both side walls of said thread groove, said wire having a smooth, polished surface and being made of a metal having good antifrictional properties together with a hardness and strength approximating that of the male screw member, and said wire being coiled initially with a diameter in excess of the threaded hole into which it is fitted.

4. A screw fastening for an apertured boss and a stud of a diameter to fit the aperture, said stud having a segment shaped thread and a non-threaded pilot end of reduced diameter having a recess and said boss having a V thread of the same pitch and of greater depth, a wire having inner and outer faces corresponding to the threads of the two parts, said outer faces of the wire forming a truncated V the crest of which does not reach the bottom of the thread groove of said boss to insure the wire seating firmly against both side walls of said thread groove, said wire being initially coiled into a spiral corresponding to the thread pitch but having an internal diameter in excess of the root diameter of the stud thread and an external diameter in excess of the thread diameter of the boss and provided at one end with a tang adapted to engage the stud recess for the purpose of compressing the coil on the stud and screwing it into the boss when the stud is inserted into and rotated in the boss aperture.

5. A screw fastening for a male screw member and a female threaded member comprising segment shaped and V-shaped threads cut in the male and female screw members respectively, a wire having inner and outer faces corresponding to the external and internal threads of the respective parts, said outer faces of the wire forming a truncated V the crest of which does not reach the bottom of the thread groove of said female member to insure the wire seating firmly against both side walls of said thread groove, said wire being coiled initially throughout the major portion of its length with a diameter in excess of the threaded hole into which it is fitted but with its first or entering convolution smaller in diameter than that of the threaded hole.

6. A screw fastening comprising a male screw member, a female threaded member with a pitch equal to that of said male member, and a spring wire coil insertable in the threaded grooves of said male and female members, the thread groove of said female member having approximately a V-shaped cross-section, and the thread groove of the male member being segment-shaped in cross-section and shallower than the groove of said female member, the cross-section of the coil wire having an outer portion shaped as a truncated V with sides converging at an angle equal to that of the thread groove of the female member, and an inner portion shaped corresponding to the thread groove of said male member, and said wire coil being initially wound with an external diameter greater than the corresponding thread diameter of said female member so as to spring in the groove of the latter and to bear wedge-like against both its sides without contacting its bottom when inserted.

7. A screw fastening as claimed in claim 6 in which the entering convolution of said coil is provided with a grip for exerting a torque to diminish the diameter of said convolution during insertion.

8. A screw fastening as claimed in claim 6 in which the entering convolution of said coil is provided with a tang projecting interiorly of said convolution.

9. A screw fastening comprising a male screw member, a female threaded member with a pitch equal to that of said male member, and a spring wire coil insertable in the threaded grooves of said male and female members, the thread groove of said male member being segment-shaped in cross-section, and the thread groove of said female member being deeper than the groove of said male member, the cross-section of the coil wire having an outer portion so shaped as to fit wedge-like the side walls of the groove in the female member without contacting the groove bottom, and an inner portion shaped corresponding to the thread groove of said male member, said wire having a smooth, polished surface and being made of a hard drawn material such as bronze having anti-frictional qualities, and being initially wound with an outer diameter greater than the corresponding thread diameter of said female member, and said male member consisting of a high strength steel hardened after the thread having been cut thereon.

10. An insert for use in a screw connection of a female and a male threaded member consisting of a wire coil of constant pitch and substantially constant outer diameter throughout the main portion of its length, the wire of said coil consisting of a hard drawn material of good antifriction qualities and having a cross-section shaped like a truncated approximately equilateral triangle on a segment-shaped base of less than semi-circular size, and an end convolution of said coil having an outer diameter smaller than the main portion of the coil.

HAROLD CAMINEZ.